Aug. 30, 1949.    M. G. KLEMME    2,480,250
SHELF ELEVATING DEVICE FOR
COOKING OR BROILING OVENS
Filed Aug. 6, 1945
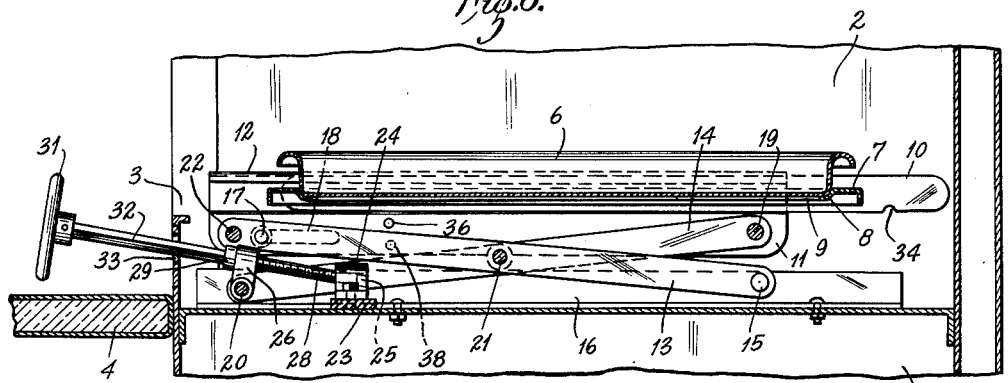
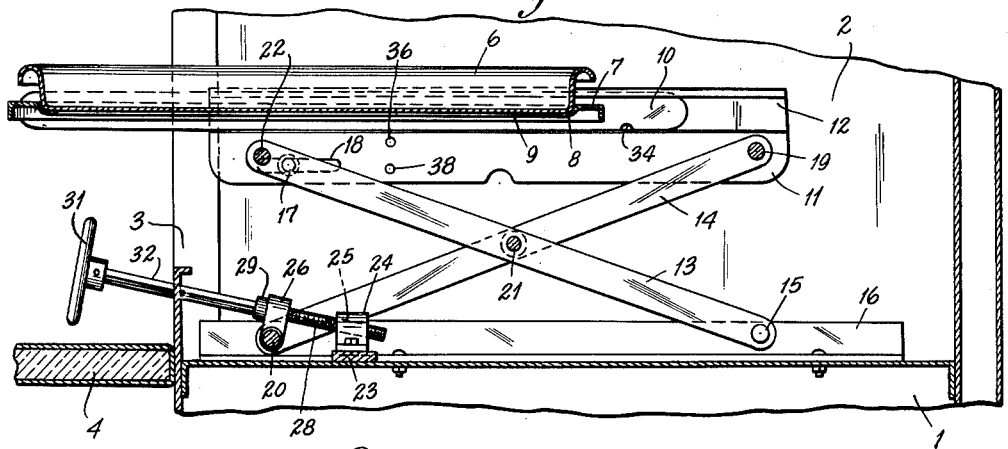
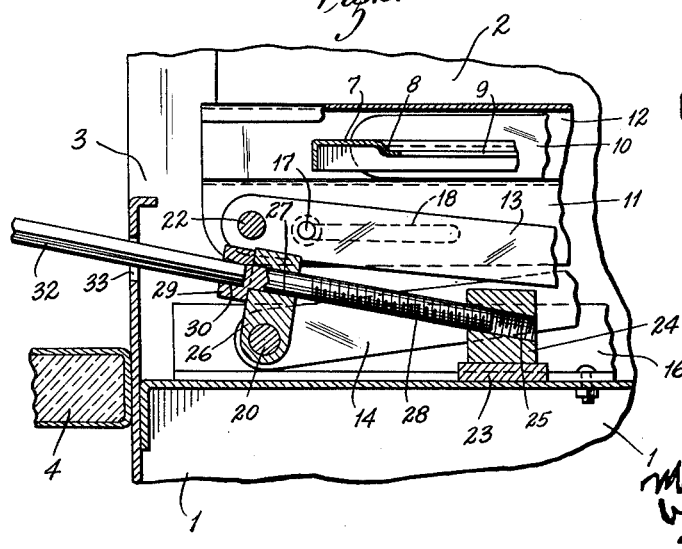
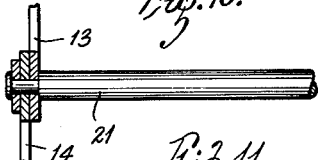
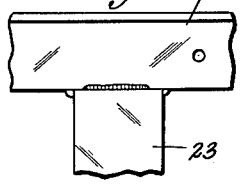
INVENTOR:
Maurice G. Klemme,
by Carr Hare & Gravely
HIS ATTORNEYS.

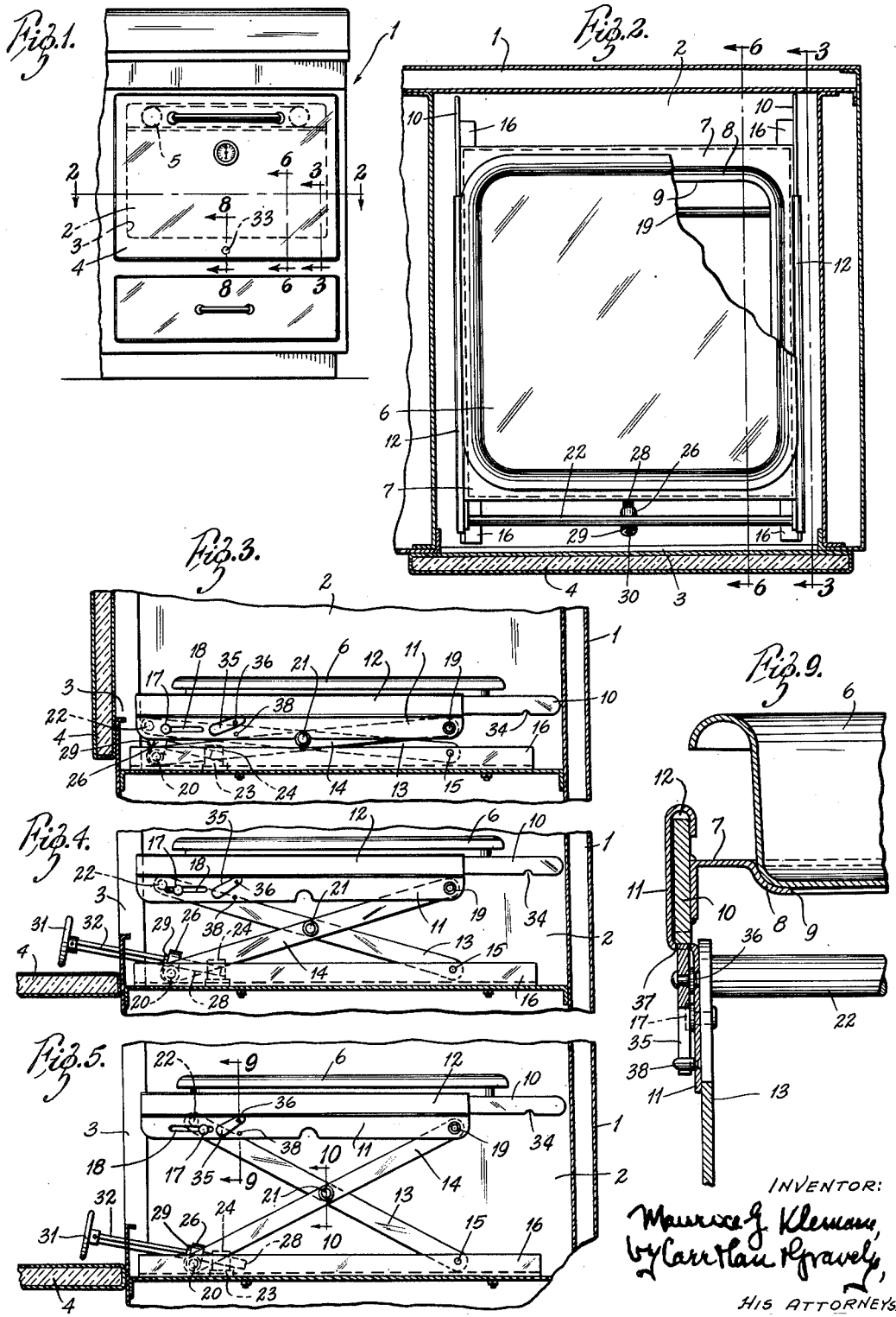

Patented Aug. 30, 1949

2,480,250

UNITED STATES PATENT OFFICE 2,480,250

SHELF ELEVATING DEVICE FOR COOKING OR BROILING OVENS

Maurice G. Klemme, Belleville, Ill.

Application August 6, 1945, Serial No. 609,123

1 Claim. (Cl. 126—41)

This invention relates to cooking stoves of the kind having broiler compartments therein. The invention has for its principal object to provide the broiler compartment with a simple and inexpensive mechanism which may be readily operated from the exterior of the stove to raise and lower the broiler pan in said compartment relative to the burner in the top thereof without removing the broiler pan therefrom. Other objects are to enable the broiler pan to be drawn outwardly through the access opening in the broiler compartment in all positions of vertical adjustment of said broiler pan and to provide for limiting such outward movement of said broiler pan. The invention consists in the construction and in the parts and combinations and arrangements of parts hereinafter described and claimed.

In the accompanying drawings which form part of the specification and wherein like symbols refer to like parts wherever they occur, Fig. 1 is a fragmentary front elevational view of a cooking stove embodying my invention, Fig. 2 is an enlarged horizontal sectional view through the broiler compartment of said stove on the line 2—2 in Fig. 1, Fig. 3 is a fragmentary vertical sectional view on the lines 3—3 in Figs. 1 and 2, Figs. 4 and 5 are views similar to Fig. 3, showing the broiler pan supporting mechanism in different positions of vertical adjustment, Fig. 6 is an enlarged vertical sectional view on the lines 6—6 in Figs. 1 and 2, Fig. 7 is a view similar to Fig. 6, showing the pan supporting mechanism raised and the broiler pan pulled outwardly through the opening in the broiler compartment, Fig. 8 is an enlarged fragmentary vertical section on the line 8—8 in Fig. 1, with the broiler pan removed, Fig. 9 is an enlarged fragmentary vertical cross-sectional view on the line 9—9 in Fig. 5, Fig. 10 is an enlarged fragmentary vertical cross-sectional view on the line 10—10 in Fig. 5; and Fig. 11 is a fragmentary plan view of one of the side sill angles in the region of the nut supporting cross bar.

In the accompanying drawings my invention is shown embodied in a cooking stove 1 having a broiler compartment 2 with a front access opening 3 that is closed by a downwardly opening door 4. As shown in the drawings, the height of the opening 3 is less than that of the compartment 2 and a suitable burner 5 is located in the top of said compartment above the level of top of said opening. A broiler tray or pan 6 is supported in the compartment 2 above the level of bottom of the opening 3.

The broiler pan 6 is supported on a horizontal plate 7 and rests in a depressed seat 8 formed in said plate around a vertical opening 9 therethrough. The broiler pan supporting plate 7 has a horizontal slide bar 10 rigidly secured to each longitudinal side edge thereof; and a horizontal side plate 11 has a horizontal slideway 12 along the upper portion thereof for said slide bar 10. Each of the side plates 11 is located adjacent to one side of the compartment 2 and is positioned so that the horizontal plate 7 and the broiler pan 6 supported thereon may be drawn outwardly through the opening 3.

Each of the side plates 11 is supported on the upper ends of a pair of crossed reversely inclined links 13 and 14, respectively. The rear lower ends of the links 13 are connected by means of horizontal pivots 15 to the upstanding legs of side sill angles 16, whose other legs are bolted flatwise to the bottom of the broiler compartment 2; and the other or front upper ends of said links have slot-and-pin connections with front end portions of the respective side plates 11, said connections comprising pins 17 on said links and horizontal slots 18 provided therefor in said side plates. The rear upper ends of the links 14 are pivotally connected by means of a horizontal cross rod 19 to the rear ends of the respective side plates 11; and the lower front ends of said links seat on the bottom legs of the sill 16 without being secured thereto and are connected by a horizontal cross rod 20. The two pairs of cross links are pivotally connected at the point of crossing or intersection of the links of each pair by means of a horizontal cross rod 21. The links 13 of the two pairs are also connected together at their front upper ends by a cross rod 22.

The two link supporting sills 16 are connected rearwardly of the lower front cross rod 20 by a rigid cross plate 23 which is provided midway of said sills with a block 24 having a threaded hole 25 extending therethrough at a rearward and downward inclination. The cross rod 20 has an upwardly extending arm 26 thereon midway of the ends thereof; and said arm has a hole 27 extending therethrough crosswise of said rod. A screw 28 has a plain portion journaled in the hole 27 in the arm 26 and a threaded end portion threaded into the threaded opening 25 in the stationary block 24. The screw 28 has a head 29 which bears against the front face of the arm 26 and has a flatsided axial socket 30 therein. The screw 28 is rotated by means of a handle 31 having a flatsided stem 32 which is inserted in a hole 33 provided therefor in the front wall of the broiler compartment 2 and engaged with the flat sided socket 30 in the head 29 of said screw.

Each of the slide bars 10 has an arcuate notch 34 in its lower edge near its rear end; and a locking lever 35 is secured by a horizontal pivot 36 to each side plate 11 near the front end thereof and below the slideway 12 therein. The lever 35 has a short upper arm that extends through an opening 37 in the bottom of the slideway 12 and bears against the lower edge of the slide bar 10 therein, the longer, heavier lower arm of said lever serving to hold the upper arm thereof in engagement with said lower edge of said slide bar. By this arrangement, when the broiler pan supporting plate 7 is drawn outwradly through the front opening 3 of the oven or broiler compartment to permit access to be had to the broiler pan 6, the locking levers 35 swing upwardly into the notches 34 in the lower edges of the slide bars 10. In this position of the levers 35, the lower ends thereof abut against stop pins 38 on the side plates 11, thereby preventing further outward sliding movement of the slide bars 10 through the opening 3.

By the arrangement described, the horizontal broiler pan supporting plate 7 may be quickly and easily raised and lowered in the broiler compartment 2 to locate the broiler pan 3 at any desired level below the burner 5 merely by inserting the stem 32 of the operating handle 31 through the hole 33 in the front of the stove into engagement with the socket 30 in the head 29 of the operating screw and then turning the handle to rotate the screw in the fixed block or nut 24.

When the screw 28 is rotated in a direction that will impart rearward axial movement thereto, a rearward end thrust is transmitted through the arm 26 and cross rod 20 to the slidably supported free front ends of the links 14, thereby causing these links and the links 13 associated therewith to swing upwardly and raise the broiler pan 6 in the compartment 2. When the handle 31 is operated to impart a forward axial movement to the screw 28, the rearward end thrust on the free ends of the links 14 is relieved, thereby permitting the cross links and the parts supported thereby to descend by gravity a distance determined by the axial position of the screw 28. Thus, the broiler pan 6 may be located at any desired level in the broiler compartment without removing and replacing said pan and without scorching or burning the hands or spillage of grease.

The broiler pan 6 may be withdrawn from the compartment 2 for inspection or treatment of the food being cooked in all positions of adjustment of the pairs of crossed broiler pan supporting links 13 and 14. The broiler pan 6, when withdrawn from the compartment, may be lifted out of its supporting plate 7. Complete disengagement of the broiler pan supporting plate 7 from its supporting slideways 11 is prevented by the engagement of the levers 35 with the notches 34 in the slide bars 10. The hole 33 for the stem of the operating handle 31 is concealed by the door 4 in the closed position thereof. The entire pan supporting mechanism is adapted for mounting in the stove as a complete preassembled unit.

Obviously, the hereinbefore described broiler pan supporting device admits of considerable modification without departing from the invention. Therefore, I do not wish to be limited to the precise arrangements shown and described.

What I claim is:

In a stove having a drawerless compartment containing a horizontal access opening, a top burner and a tray beneath said burner, the combination of means permanently located entirely in said compartment for raising and lowering said tray therein relative to said burner without moving said tray forward or backward in said compartment, said means comprising two pairs of crossed reversely inclined links extending from the front portion of said compartment to the rear portion thereof, the links of each pair being pivotally connected at their point of crossing for relative vertical swinging movement about such pivot point, a horizontal pivotal support for the rear lower end of one of the links of each pair, the lower front end of the other of said links of each pair being endwise slidable in said compartment, means cooperating with said lower ends of said other links for imparting such endwise sliding movement thereto, side plates pivotally supported on the upper ends of both pairs of links for vertical movement therewith, said side plates having longitudinal slideways therein, a supporting plate for said tray supported in said slideways for sliding movement relative to said links into and out of said compartment through the horizontal access opening therein in all positions of such vertical movement, and releasable means for limiting the outwardly sliding movement of said plate.

MAURICE G. KLEMME.

REFERENCES CITED

The following references are of record in the file of this patent:

UNITED STATES PATENTS

| Number | Name | Date |
| --- | --- | --- |
| 1,352,352 | Caswell | Sept. 7, 1920 |
| 1,586,324 | O'Dowd | May 25, 1926 |
| 1,798,825 | Wilkinson | Mar. 31, 1931 |
| 1,811,428 | Dibble | June 23, 1931 |
| 1,840,460 | Maul | Jan. 12, 1932 |
| 1,861,689 | Dibble et al. | June 7, 1932 |
| 1,922,585 | Hoffstetter et al. | Aug. 15, 1933 |
| 1,941,301 | Hanson et al. | Dec. 26, 1933 |
| 1,986,035 | Wells | Jan. 1, 1935 |
| 2,029,449 | Teller et al. | Feb. 4, 1936 |
| 2,064,601 | Gregorich | Dec. 15, 1936 |
| 2,114,697 | Babin | Apr. 19, 1938 |
| 2,133,835 | Sherman et al. | Oct. 18, 1938 |
| 2,224,164 | Sherman et al. | Dec. 10, 1940 |

FOREIGN PATENTS

| Number | Country | Date |
| --- | --- | --- |
| 464,153 | Great Britain | Apr. 13, 1937 |
| 748,464 | France | Apr. 18, 1933 |